United States Patent [19]

Hawley

[11] 3,986,393
[45] Oct. 19, 1976

[54] PRECISION MEASURING SYSTEM FOR DOWN-HOLE PRODUCTION LOGGING OIL TOOLS

[76] Inventor: Jack S. Hawley, 925 Delaware, Berkeley, Calif. 94710

[22] Filed: Mar. 7, 1975

[21] Appl. No.: 556,280

[52] U.S. Cl. .............................. 73/154; 73/362 AR
[51] Int. Cl.² ..................... E21B 49/00; G01K 1/02; G01K 7/24
[58] Field of Search ........... 73/154, 362 R, 362 AR; 340/18 FM, 18 P

[56] References Cited
UNITED STATES PATENTS

| | | | |
|---|---|---|---|
| 2,315,127 | 3/1943 | Mounce | 73/362 AR |
| 3,359,801 | 12/1967 | Rasmussen | 73/344 |
| 3,410,136 | 11/1968 | Johns et al. | 73/154 |
| 3,490,286 | 1/1970 | Schwartz | 73/362 R |
| 3,648,523 | 3/1972 | Kemper et al. | 73/361 |
| 3,672,215 | 6/1972 | Stout et al. | 73/154 |
| 3,688,581 | 9/1972 | Le Quernec | 73/362 AR |
| 3,732,728 | 5/1973 | Fitzpatrick | 73/345 UX |
| 3,906,391 | 9/1975 | Murdock | 73/362 AR X |
| 3,933,046 | 1/1976 | Ebrecht | 73/362 AR |

Primary Examiner—Richard C. Queisser
Assistant Examiner—Frederick Shoon
Attorney, Agent, or Firm—Flehr, Hohbach, Test, Albritton & Herbert

[57] ABSTRACT

A precision measuring system of extraordinary accuracy particularly adapted to down-hole production logging tool strings. The disclosure emphasizes both compensating and immunizing error reduction means for hostile environments comprising varying line currents as well as large and rapidly changing ambient temperature extremes. Standard sensors and transducers are utilized, linearized, and error corrected. Calibration means permit outputs in familiar engineering units and scales. Accuracy exceeds ± 0.4% of full scale or, in the case of temperature measurements ± 1°F from 50°F to 300°F.

2 Claims, 14 Drawing Figures

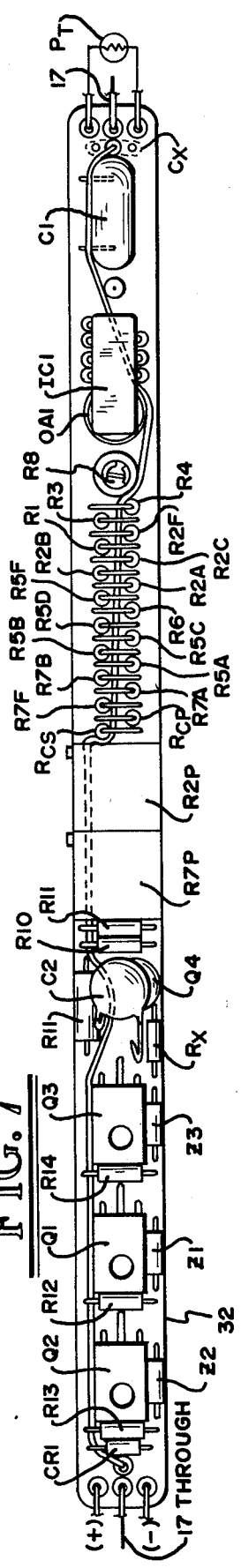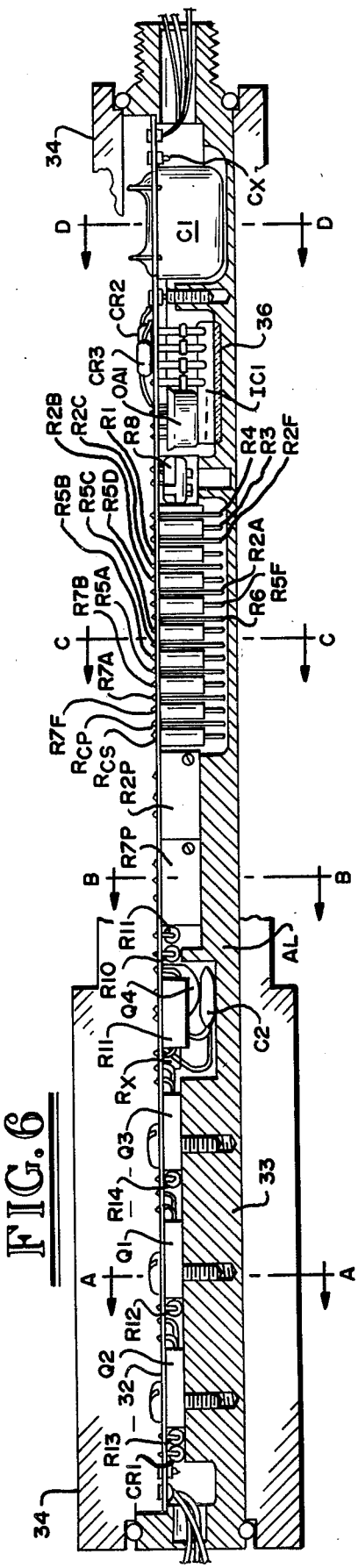
FIG. 7
FIG. 6

PRECISION MEASURING SYSTEM FOR DOWN-HOLE PRODUCTION LOGGING OIL TOOLS

BACKGROUND OF THE INVENTION

The present invention is primarily directed to the precise measurement of down hole variables in oil wells.

It has been for many years the custom to make a temperature run in a production or injection well as a routine part of a production logging operation. The data so gathered is recorded on an analog roll chart in the logging truck. Although there are many exceptions for varying reasons, the typical format is to roll the chart paper in synchronization with the cable odometer so that two inches of chart travel is equal to 100 feet of depth. The chart paper is usually ten inches wide excluding the perforated margin. This across-chart axis is used for the amplitude of the variable being measured.

PRESSURE BACKGROUND

Pressure logging unlike temperature logging is not routine. Nevertheless precise down-hole pressure measurements are important to the proper management of injection well systems. As for example an improperly regulated injection well is quite capable of seriously fracturing a geological formation by the insertion of hydrostatic pressure exceeding the cohering pressure produced by the weight of the overburden at the depth of the vulnerable formation.

Injection wells are a vital part of secondary recovery operations in oil fields. Their purpose is to displace oil to maintain oil pressure at the producing wells and also to provide a vertical pressure in unstable formations, the collapse of which, would cause unacceptable surface subsidence.

For reasons including the obvious ecological hazards, various political jurisdictions apply stringent operating requirements to the operation of injection wells with particular requirements pertaining to periodic downhole pressure measurements to assure compliance with imposed pressure standards.

It is not enough to measure the well-head pressure, calculate the fluid column pressure and the overburden weight for the appropriate depth. Injection is complex; many wells contribute to a certain stratum while concurrently single wells often contribute a several strata. Formation permeability is not constant over a long period. Tubing strings become choked with scale, or dilated, and even perforated, by erosion and/or corrosion.

A first requirement for down-hole pressure measurements is a continuous pressure profile logging run in such wells using a conductor cable tool string. Such a profile would require precision, as well as multiple chart-width resolution, in convenient engineering units similar to the temperature system hereinafter described.

A second requirement for down-hole pressure measurements is to provide pressure fall-off curves in production wells for calculating formation permeability.

For this purpose a pressure measuring tool is introduced into the bottom of a producing well. The well is shut in to permit the fluid column to fall while the pressure tool measurement is plotted against time.

A third requirements for down-hole pressure measurements is to analyze the performance of gas-lift wells and the proper functioning of the string of automatic valves associated with the gas-lift wells.

Prior down-hole pressure measurements means, of sufficient accuracy to satisfy the foregoing first and second requirements, is limited to a purely mechanical device. The mechanism in a suitable pressure housing is introduced into a well on the end of a high tensile wire or cable. This device is known as a pressure bomb.

A typical pressure bomb includes a mechanical pressure element, such as a bourdon tube, linked to a stylus. The stylus is arranged to scribe the locus of its path on a blackened foil which is wrapped around a cylinder. The cylinder is moved by spring-driven clockwork means. Where the pressure stylus is moved circumferentially as pressure increases the cylinder is moved axially with time. Conversely in another design the stylus is moved axially in response to pressure while the cylinder is rotated by the clockwork.

The effect of either system is to provide a foil, which when uncoiled, is inscribed with a miniature X-Y plot of time on one axis, and pressure on the other. This miniature plot is laboriously interpreted under a microscope equipped with a reticle and a micrometer X-Y measuring stage to which the foil is attached. Accuracy is thought to be assured by frequently dead-weight testing these pressure bombs. An updated individual calibration table is produced as a part of the testing procedure for later use in interpreting the microscope stage readings.

The utilization of presure bombs to provide pressure profiles correlated with depth is quite crude. A series of so-called stop-checks are made by lowering the tool, pausing long enough to permit the stylus to draw a straight line step, and then moving on. At each pause the depth is manually listed. These pause-produced steps are counted and correlated with the depth-list when the resultant X-Y chart is interpreted.

Pressure bombs produce excellent pressure fall-off curves but it is usually necessary to shut in the producing well for 24 hours or more because the unknown variable is time. The typical pressure fall-off curve is orderly and capable of extrapolation if a sufficient part of the curve is logged. Because pressure bombs do not communicate directly with the surface it is not known how much time is needed.

In those wells where the fall-off curve is rapid the shut-in time can be reduced by the use of a surface reading pressure tool. Such equipment can prevent substantial losses of money attendant on lost production time. In light of the foregoing it is evident that pressure bombs cannot be of much value in the detailed analysis of gas-lift performance.

Prior conductor cable tools theoretically capable of satisfying the various requirements for down-hole pressure measurements have not heretofore achieved sufficient accuracy to offset their obvious advantage.

TEMPERATURE BACKGROUND

Substantial efforts have been made to obtain precise down-hole temperature measurements as will be described. All down-hole electronic systems are subject to enormous attack on their accuracy by environmental conditions; but in the case of temperature-measurement care must be exercised to compensate for such conditions.

To avoid confusion it is essential to understand and distinguish between two separate thermal phenomena. To facilitate this the following definitions will be established and referred to hereafter by their mnemonic initials:

1. Unknown Well Temperature (UWT). This is the temperature whose value is sought as accurately as possible, and which is coupled closely to the sensor.

2. Hostile Environmental Temperature (HET). This is the temperature whose variation over a wide range represents an obstacle to accuracy by causing value drifts in electrical components and/or long metallic conductors which are exposed thereto.

Prior tools for logging well temperatures often use down-hole frequency generating outputs. These outputs are compatible in form with the present invention but such tools fail to meet one or more of the objects of the present invention. Where thermistors are used as the sensor, prior apparatus suffers long term drift and noninterchangeability of sensors. The attendant need to custom calibrate each individual tool usually results in a nonlinear calibration chart with arbitrary non-mnemonic engineering units. Less of the above problems appear when platimun bulbs are used but in both cases large errors result from the drift of circuit components due to the HET.

Another system having an accuracy capability several times that of prior single conductor systems, utilizes three conductors in the down-hole cable. A dc bridge circuit is utilized and all electronic components are at the surface. To minimize the effects of the HET on the copper conductors a 2000 ohm platimun bulb is used and a remotely controlled down-hole switch is arranged to short out the bulb during a down-hole calibration procedure prior to a logging run. Despite these efforts, the change in resistance of the copper conductors during a run can introduce an error of 2° to 3°F.

However it should be pointed out that this is an orderly and systematic error and can be calculated out where accuracy requires it. A major disadvantage to this system arises from the unpopularity of three conductor cable and the awkward purchasing logistics required of the logging company to keep it on hand. The 2,000 ohm bulb is relatively massive and has a large temperature lag requiring very slow runs to log the UWT salience adequately. The calibration procedure further diminishes the productivity of the logging crew, as do the calculations attendant on the nonlinearity of the platinum bulb and the change in the conductor resistance. A further serious disadvantage to this system is the multiplicity of electrical slip rings associated with the drawworks (cable winch) and the deleterious effect of imperfect sliding contacts on small analog signals.

OBJECTS AND SUMMARY OF THE INVENTION

It is, therefore, an object of the present invention to provide an improved precision measuring system for down-hole use which requires only a single conductor but yet is highly accurate.

It is another object of the invention to provide specific tools as above in which readings are directly available in typical engineering units.

It is another object of the invention to provide a temperature tool as above which utilizes a standardized, stable, and interchangeable sensor of low thermal mass.

It is another object of the invention to provide temperature pressure and other tools as above having immunity to varying power supply currents and the effects of HET, and (where the foregoing immunity is absent) compensation means included to minimize all anticipated deleterious effect on accuracy.

It is another object of the present invention to provide packaging means together with compatible testing and calibrating means to facilitate the manufacturing, calibrating, testing, and compensating of specific tools for use in the above precision measuring system.

A precision measuring well tool for use in a tool string comprises sensing means for sensing a predetermined characteristic of the well. Electrical means convert the sensed characteristic to an electrical output signal having a frequency related to the value of the sensed characteristic. Heat sink means retain all of the components of said tool for immunizing said electrical means against the effects of hostile environmental temperature.

BRIEF DESCRIPTION OF THE DRAWINGS

FIG. 6 is a cross-sectional view of the tool of the present invention;

FIG. 7 is a plan view of a part of FIG. 6;

DETAILED DESCRIPTION OF THE PREFERRED EMBODIMENTS

The essence of the present invention can best be understood by concentrating on one specific tool with respect to details. The temperature tool is chosen for this purpose as it is believed that this tool best illustrates the important features. Following the detailed temperature tool description, the variations in circuitry required to produce other tools will be described in order to illustrate the scope of the basic concepts.

When a production logging tool string is used with a single conductor cable it is convenient to power the downhole tools in a series string. In this configuration the topmost tool receives its power from the logging truck directly from the conductor cable. The next lower tool receives its power from the lower terminal of the topmost tool and so on down to the bottommost tool whose lower terminal is grounded to the outer pressure housing of the tool string and, by way of the rope socket, to the steel jacket which comprises the armor and tensile features of the single conductor cable.

Figure 1:
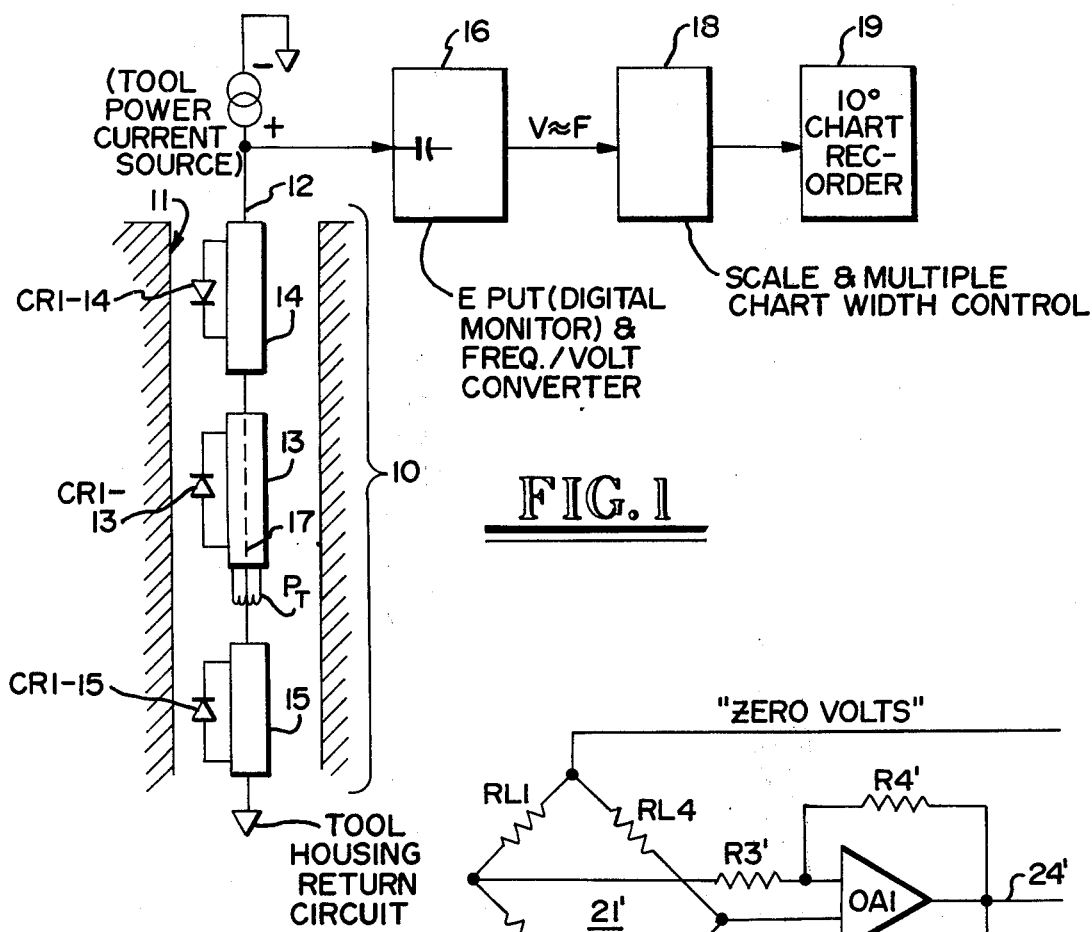
FIG. 1 is a diagrammatic view of a logging system embodying the present invention.

FIG. 1 illustrates a possible configuration of an oil well tool string 10 which however embodies the temperature measuring tool of the present invention as it might extend down an oil well indicated schematically at 11. Armored single conductor cable 12 lowers the tool string and has a nominal current of 60 milliamps dc through it. In accordance with known practice, and more particularly with respect to the illustrated configuration, the temperature measuring tool 13 includes the diode CR1-13 which is non-conductive when conductor 12 is positive. Another tool 14, which may be a gamma tool or a pressure measuring tool of the present invention, has a similar diode CR1-14 across its circuitry but is oppositely poled thus conducting current to effectively bypass tool 14 leaving it unpowered.

A third tool 15, may be a spinner (flow rate meter) if the well is an injector, or an oil-profile tool if the well is a producer. The oil-profile tool 15 is disclosed in U.S. Pat. No. 3,792,347 in a configuration compatible with a three conductor cable. In the present single conductor tool string 10, oil profile tool 15 is equipped with circuitry appropriate to the present invention as will be disclosed herein.

Tool 15 includes the diode CR1-15 poled like tool 13. Theoretically the signals from tools 13 and 15 would conflict with one another if both tools could signal simultaneously.

In order to preclude such conflict of signals, the temperature measuring tool 13 of the present invention is provided with a low current disabling means so the tool will not provide an output when powered by a current lower than, for example, 40 milliamperes. Similarly, tool 15 is provided with a high-current disabling means to preclude an output when the current through line 12 exceeds, for example, 30 milliamperes. Suitable high-current and low-current disabling means will be described below.

From the above it clearly follows that a fourth tool (not shown) could be installed in the tool string 10, with its diode poled like CR1-14, if the two tools were equipped with current responsive disabling as above.

The preceding configuration deescription is intended as illustrative only. The choices of position of the various tools in the string 10 as well as their assigned polarity and operating currents may vary from that shown.

The temperature measuring tool 13 of the present invention, in its preferred embodiment, is provided with both positive and negative pigtails at one end together with a utility through-tool conductor 17 to permit ease of reversing its polarity assignment in a tool string assuming it would be undesirable to reverse the entire tool end for end.

It should be understood that the packaging of the present invention in suitable pressure housings with appropriate flow paths to the sensors and suitable mechanical and electrical inter-tool connecting means is subject to rather broad variations in practice. The tools described herein represent accurate functional instruments capable of taking their places in a wide variety of tool strings. Particular emphasis is made to the disclosure of a relatively slim electronic package which in its barest form is no more than 0.625 inches in diameter while still retaining a sufficient HET distribution means as later described.

In typical use with tool 13 powered by a positive 60 milliampere current through conductor 12 as a FIG. 1, the tool reports to the surface by modulating the powering current. Pulses result from a periodic saturation of transistor Q3 (FIG. 3) which is normally clamped at 6V by means of Zener diode Z3. The preferred pulse rate is 10 Hertz per degree of Fahrenheit.

At the surface the pulses appear as voltage variations of a similar amplitude but somewhat degraded by the capacitance and resistance of the armored conductor 12. It is common practice to capacitively couple these pulses from conductor 12 and display the frequency on a one second sampling EPUT meter 16. It is further the practice to convert the pulse rate into an analog voltage suitably scaled to provide a multiplicty of traverses across the 10 inch chart width. Manual switching is customarily provided by a suitable panel 18 to cause the chart pen to return across the chart after reaching full scale.

This use of a multiplicity of chart widths to record temperature is primarily to permit the analysis of UWT salience for detecting fluid entries and exits. Prior tools with individual calibration table with or without large uncertainity factors, or even tools with orderly errors of a few degrees, cause difficulty in interpreting specific temperature values on a chart 200 inches wide which is chopped up into 10 inch increments in a linear relationship to the signal, rather than the actual UWT.

Where a tool as in the present invention is of extraordinary accuracy and linearity, and is calibrated in familiar engineering units such as degress Fahrenheit or Centigrade and decimal fractions thereof, the EPUT meter is instantly meaningful to the operator and the 10 inch increments on the chart do not accumulate errors of several inches as the number of chart widths increases. Accordingly, the preferred temperature embodiment of the present invention is calibrated so that each 10 hertz of reporting signal is equal to one degree Fahrenheit; other convenient scales are easily accommodated by a simple substitution of component values. Similarly, other sensor values and types may be used should there be a reason to do so.

To those familiar with conventional circuity the power supply within the tool may be thought of as a +4 volt supply and a −22 volt supply both of these voltages being moderately regulated by shunt Zener diodes and being referenced to a common intra-tool zero volt line.

Figure 3:
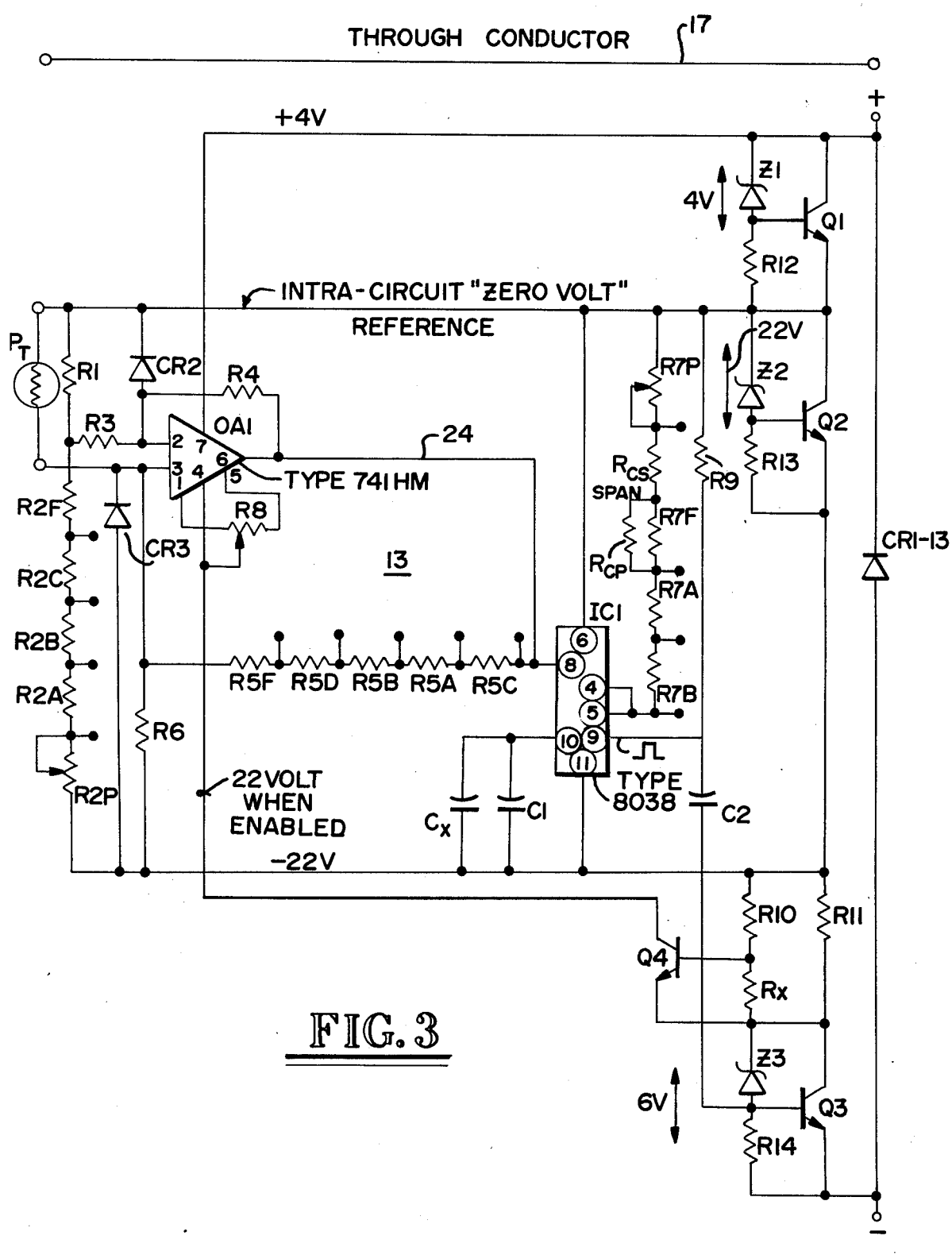
FIG. 3 is a more detailed circuit diagram incorporating FIG. 2 of the tool of the present invention.

FIG. 3 shows the relationship of these power supply lines and the composition of the shunt regulators. Each effective power Zener diode is in reality composed of a power transistor, a resistor, and a small Zener diode. These are Q1, R12, Z1 and Q2, R13, Z2 for the +4 volt and the −22 volt lines respectively. This arrangement has been found to be easier to couple to heat sinking means than the commonly available power Zener diodes and in addition is convenient to apply to the printed circuit board. Further convience arises out of the identical form being controllable as shown by the output stage Q3, R14, Z3.

The +4 volt supply furnishes the positive power required by the operational amplifier OA1 to assure that its output voltage can reach the zero volt level with no degradation of performance. It is the nature of such an operational amplifier to require such an additional voltage while at the same time to be practically immune to the variations in the positive power supply.

Figure 2:
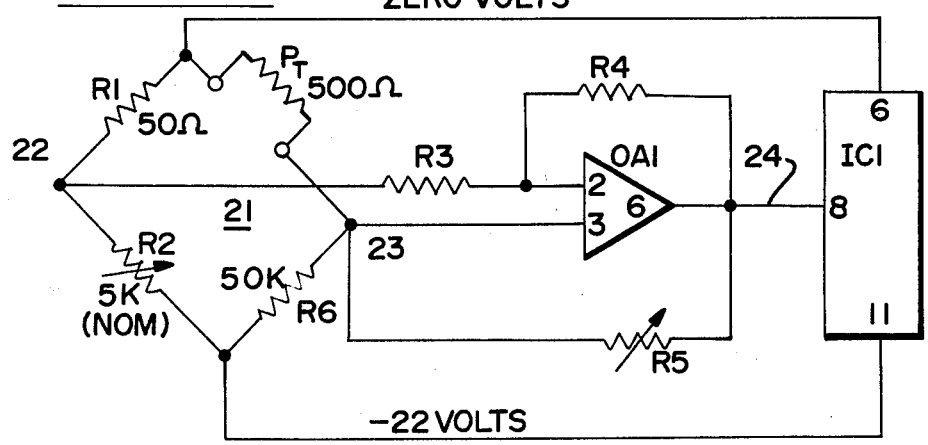
FIG. 2 is a simplified circuit diagram of a portion of the invention.

A portion of the circuit of the tool 13 is illustrated in simplified form in FIG. 2 where the temperature probe $P_T$ forms one leg of a Wheatstone type bridge which includes resistors R1 and R6 and variable resistor R2 with the indicated impedances in ohms. Temperature probe, $P_T$, which is a platinum bulb has a resistance of 500 ohms at 32°F. and varies from a high of 788 ohms at 300°F. down to 464 ohms at 0°F. In addition, the change of resistance of such bulbs is nonlinear with temperature; for example, a change from 50° to 60°F. produces an 11 ohm change and a change of temperature from 290° to 300°F. produces a change of 10.5 ohms. Thus, $P_T$ is nonlinear. The bridge 21 is powered by the −22 volt supply. The null output at points 22 and 23 is coupled to an operational amplifier OA1 which includes the series resistor R3 and the negative feedback resistor R4. The circuit thus described provides a negative voltage output on line 24 proportional to the output of the bridge.

The output of bridge 21 is not a linear function of temperature however due to the nonlinearity of the platinum bulb, the loss of current provided by R6 as the platinum bulb increases its resistance, and the increase in current through R1 causes by the increasing current provided by R3 as the summing junction pin 2 increases its negative potential.

All of these errors are orderly and operate to reduce the increment of bridge output per unit of UWT at the high end of the scale. A nearly perfect correction of these errors is provided by the positive feedback resistor R5 which is shown connected between output line 24 and bridge point 23. In this simplified illustration it is apparent that resistor R5 adds to the current through the platinum bulb as the output line 24 goes more negative. By this means the output of the bridge closely approximates a linear relationship with the UWT.

Figure 8:
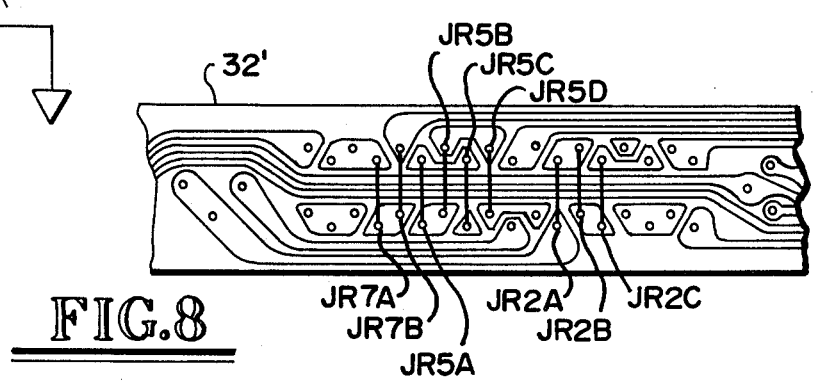
FIG. 8 is a plan view of a part of FIG. 6.

The bridge 21 and the operational amplifier OA1 together with its non-variable resistors R3 and R4 thus provide a suitable negative voltage on line 24 which is coupled to a voltage controlled oscillator IC1 which may be an integrated circuit such as the type 8038 available from Intersil, Inc. Pin 8 is the sweep input of the integrated circuit. As shown in FIG. 3 its frequency span is determined by resistor R7 coupled to terminals 4 and 5 and the value of the timing capacitors $C_x$ and C1 coupled to pin 10. The frequency within the span is determined by the negative voltage presented to pin 8 relative to the zero volt pin 6. The VCO IC1 is not perfectly linear relative to the precision of the present invention and as a consequence of this nonlinearity further use is made of the positive feedback resistor R5. It is the variation in the VCO IC1 from unit to unit that dictates that R5 be either custom loaded or adjustable. It has been determined that a very close linearity between the UWT and the output frequency of the VCO IC1 can be achieved if R5 is made variable in 10K ohm increments from about 150K ohms to about 300K ohms. FIG. 3 shows R5 to be comprised of a series of resistors R5F = 150K, R5D = 80K, R5C = 40K, R5B = 20K, and R5A = 10K. Convenient jumpering means shown in FIG. 8 permit the selection of the appropriate value of R5 in 10K increments. Despite the choice of a high quality selected grade of the VCO IC1 some units require more and some less resistance in R5 than that value which would linearize the voltage on line 24 with the actual UWT.

The power terminals for the VCO IC1 are pin 6 positive, and pin 11 negative. FIG. 2 shows the bridge 21 and the VCO IC1 both powered from the same −22 volt line. It is the nature of the VCO to provide a stable frequency regardless of supply voltage changes provided that the input voltage varies in exact ratio with the power voltage.

It is an important feature of the present invention that the circuit configuration has a very large immunity to errors arising on account of variations in the supply voltage, which variations do indeed occur on account of the HET. The negative supply also varies due to current changes on line 12 when relatively crude tool power is employed or personnel are careless. This immunity feature permits the rather simple shunt regulator to be employed though the tool accuracy will not suffer more than 0.1% over the full HET range together with a line 12 current change of 40 to 150 milliamperes in any combination.

Another important feature of the present invention is the novel use of the potentiometer R8 as shown in FIG. 3. Operational amplifier OA1 may be of the type 741 HM available from Fairchild Corporation. Its pin numbers 1 through 7 are shown; 4 and 7 are its power inputs, 2 and 3 are its inverting and non-inverting inputs respectively while 6 is the output pin. Pins 1 and 5 are normally provided to adjust the offset voltage to zero between pins 2 and 3.

A well known obstacle to accuracy in solid state analog circuits is the variation of transistor base-emitter voltages with temperature. The VCO IC1 suffers this anomaly somewhat at its voltage input pin 8. The effect of this aberration is to produce an output which is too high or too low by as much as 50 or 60 Hertz when the HET is raised. This is by way of an offset error, that is, the error is nearly constant over the total UWT at a given HET. As a result the analog voltage on line 24 to the input pin 8 is in reality referred to a varying voltage point rather than the zero-volt line.

It has been found that potentiometer R8 in a circuit as shown can be purposely unzeroed to introduce an offset voltage between pins 2 and 3, which offset voltage will increase with the HET slightly in the same direction in which it was initially offset. More than that, the increase in offset due to the increase in the HET is proportional to the initial unzeroing offset applied by potentiometer R8.

The fixed gain of the operational amplifier OA1 in the preferred embodiment has been chosen in part to permit this compensating offset effect to be amplified sufficiently to permit the trimming of potentiometer R8 to almost exactly track the above input variations at pin 8 of the VCO IC1. The trimming operation must be accomplished by a change in resistor R2 to re-initialize the system accuracy, otherwise R2 could have been of a fixed value. Resistor R2 must like R5 is composed of a series of resistors whose successive values increase by a factor of two. Similar jumpering means are provided except that a potentiometer R2P is provided to refine the resulution of the least jumper-produced increment.

Resistor R7 includes resistors R7A, R7B, which have jumper connections for jumpering them, resistor R7F and a potentiometer R7P. Resistor R7 essentially adjusts what is termed span which is the frequency output per volt of input. Still referring to FIG. 3, the actual span is determined by the RC relationship between resistor R7 and capacitor C1.

It is another important feature of the present invention to provide compensation for the drift in span due to the effect of the HET on VCO IC1. For this purpose there is provided mounting positions on R7 for temperature responsive resistors $R_{CS}$ and $R_{CP}$. These resistors are utilized as required either singly or together their value being determined by the change required of R7 as the HET is increased as well as the initial value required of R7. It has been found that very satisfactory compensation may be effected by choosing appropriate values for either or both resistors $R_{CS}$ and $R_{CP}$ from the common ¼ watt 10% resistors offered by such firms as the Allen-Bradley Co., though other types may be used if they possess the requisite temperature coefficient.

The above span compensating means provides for the condition where the uncompensated IC1 IC1 would produce an output frequency whose error increases with the UWT due to increases in the HET. This is corrected by an increase in the value of resistor R7 as the HET increases.

Where the span compensation is required in the opposite direction an auxiliary capacitor $C_X$ may be introduced in parallel with capacitor C1. Capacitor $C_X$ in such a case must have a temperature coefficient such that the capacitance will be reduced as the HET increases. This compensating capacitor provides only a gross adjustment which, if not fortuitously exact, must be slightly greater than necessary in order to permit compensation resistors $R_{CS}$ and $R_{CP}$ to be installed to perform their finer compensating function.

An additional immunity to the various aforesaid sources of accuracy drift is the use of 1% resistors of the well-known specification RS55D having a temperature coefficient of ±100 parts per million per degree Centigrade. It is obvious that even with this relatively tight specification a worst case error over the worst range of the HET could produce an additional burden on all the above compensation means of at least 2.5%. It is therefore good practice to enhance the immunity by further providing precision resistors of one style only and preferably from one manufacturer. By this means the likelihood is great of the temperature coefficient being all positive or all negative. This practice has resulted in great integrity in the output on line 24 leaving the major burden of compensation to the deviations peculiar to the solid state devices OA1 and IC1.

The actual output of the VCO IC1 is in the form of a square wave at pin 9. Within the VCO an open collector transistor is alternately turned on and off at the output frequency. Resistor R9 provides the necessary collector load to the zero volt line while capacitor C2 provides coupling to the output transistor Q3, previously described as a part of the power string. The preferred pulse width or saturate time of transistor Q3 is approximately 0.1 milliseconds for most types and lengths of line 12. This pulse width is obtained when C2 has a value of 0.01 microfarads. The output pulses may be increased to the 50% duty cycle of the output of the VCO IC1 when desired by making the value of C2 very large or by dc coupling using a Zener diode for a voltage level shifter in place of capacitor C2. It is also possible to separate pins 4 and 5 of VCO IC1 and control the duty cycle of the output pulses by using a separate resistor R7 on each of such pins.

As discussed in conjunction with FIG. 1 with respect to selection of similarly poled tools on a well string, a convenient low current disabling means is provided by the simple expedient of depriving the operational amplifier OA1 of its ability to provide a negative voltage to pin 8 of the VCO IC1. This is accomplished by disconnecting operational amplifier pin 4 from the source of negative power. The inherent large error immunity to a varying power source in this operational amplifier configuration permits the use of a simple transistor switch. The low current disabling switch is diagrammed in FIG. 3 and comprises resistors R10, R11 and $R_X$ together with transistor Q4. The transistor is turned off when a low current in line 12 causes an insufficient voltage drop across resistor R11, as divided by resistors R10 and $R_X$, to reach the forward base emitter voltage of transistor Q4. The desired turn-off current through line 12 can be set by choosing an appropriate value for resistor $R_X$.

The various linearizing, immunity and compensation techniques thus far disclosed will not conceptually achieve perfection. To those skilled in the art it is evident that the coefficient of drift of the various compensation elements do not exactly match at all values of the HET. However, the important feature of the various techniques is that they can be varied both as to direction and amplitude. The compensation of tracking errors represents only a few percent of the uncompensated error. As an example, where the total uncompensated tool error with, of course its immunity features, might be as much as ±8° Farenheit the compensation disclosed herein can reduce this error to ±1° Farenheit with ease, and to as little as ±0.3° F with care, over the total line current HET, and UWT range in any combination.

The foregoing part of the disclosure has dealt almost entirely with circuitry elements; however the succeeding disclosure relative to the packaging and testing means are a material part of the subject invention not in the limiting sense but rather by way of additional teaching.

In down-hole instruments such as the subject invention the HET may change rapidly outside the pressure housing. It is not uncommon to move down-hole tool strings at the rate of 600 to 1,000 feet per minute for positioning purposes. For logging runs the line speed is much less. At a typical thermal gradient of 2° F. per hundred feet it can be seen that a HET change of 200° F. might occur in ten minutes.

The various electronic components comprising the above linearizing, immunizing, and compensating means do not all have a similar thermal mass nor do they possess equal thermal conductivity particularly where some of the sensitive elements are buried in an insulating encapsulent while others have a metal or ceramic shell. Some of the elements in the present invention such as the power transistors Q1, Q2 and Q3 and to a lesser extent the VCO IC1 produce significant quantities of heat from within. The power transistors produce sufficient heat as to require heat sinks.

It is an important feature of the present invention to provide a practical means to assure that all of the accuracy-critical sensitive interior elements of the electronic components are subject to the same HET at the same time.

It is another feature of the present invention that the foregoing HET control means includes access means to facilitate the initial calibration and compensation procedures disclosed and to permit later factory repair and recalibration as required.

Referring to FIG. 6 there is provided a metallic thermal mass element 33 and a printed circuit element 32. These elements are joined by screws and are therefore separable. The thermal mass element 33 is preferrably cylindrical and provides close fitting with the various electronic components as shown in the cross section views of FIGS. 6A, 6B, 6C and 6D.

FIG. 7 shows an underside view of the printed circuit 32 with the various electronic components installed. The placement of the components is critical. All of the accuracy sensitive components are together at the C1 end while the non-critical and heat producing components are at the other end. In fact, the latter components are in descending order of heat emission from the end toward the center, while the former components are in descending order of HET vulnerability from their end toward the center.

The variable resistors R2P and R7P being rather bulky as well as comparatively HET insensitive, by reason of their small trimming function, are placed near the center as a convenient physical separator of the two groups of components.

Another substantial contribution to accuracy is provided by the intimate proximity between the operational amplifier OA1 and the VCO IC1.

The latter self heats to some extent while the former should ideally be at the same temperature as the latter. The unused pins (sine wave output, etc.) of VCO IC1 are removed and the package is raised by pin extension means. In order to permit rapid power-on stabilization between these two components thermal insulating means 36 is provided to decouple VCO IC1 from the thermal mass element 33. Insulating means 36 acts to confine the exotherm from the VCO IC1 to the operational amplifier OA1. In addition, when the thermal mass element 33 is transferring heat to or from these two components, transfer is limited to the sides of said components and therefore tends to be equal.

A highly desirable feature in down-hole electronic packages is slimness where the available inside diameter is limited. When necessary the present electronic package means including the thermal mass element may be directly installed in a ⅝ diameter bore. Greater tool accuracy is obtained where space permits by enclosing the package in a close fitting thermally conductive tube. Ideally the tube should have an outside diameter providing a snug fit in the tool pressure housing. The diameter should extend from the heat sinking end of the thermal mass element 33 to approximately the position of transistor Q4. The tube should be of smaller diameter and be insulated from pressure housing for the remainder of its length to provide a slower thermal path for the possibly rapidly changing HET in the well.

Such a tube 34 is fragmentarily indicated in FIG. 6. Copper would be a very good choice from which to make the tube 34 and the thermal mass element 33. Experience has shown however that a free matching aluminum alloy such as 2024-T4 is a more economical choice. The total system integrity can usually afford the small degradation attendant on the use of aluminum.

It is another feature of the present invention that the thermodynamic control means be compatible with suitable simulating means. It is the purose of the control means 33 and 34 to retard the transference of HET variations from outside the tool while at the same time equally distributing the retarded HET and coupling it closely and evenly to the appropriate circuit elements.

Such retardation is a deterrent to efficient testing, compensating and calibrating procedures except that there is provided, as a part of the packaging system of the invention a HET simulator.

Figure 4:
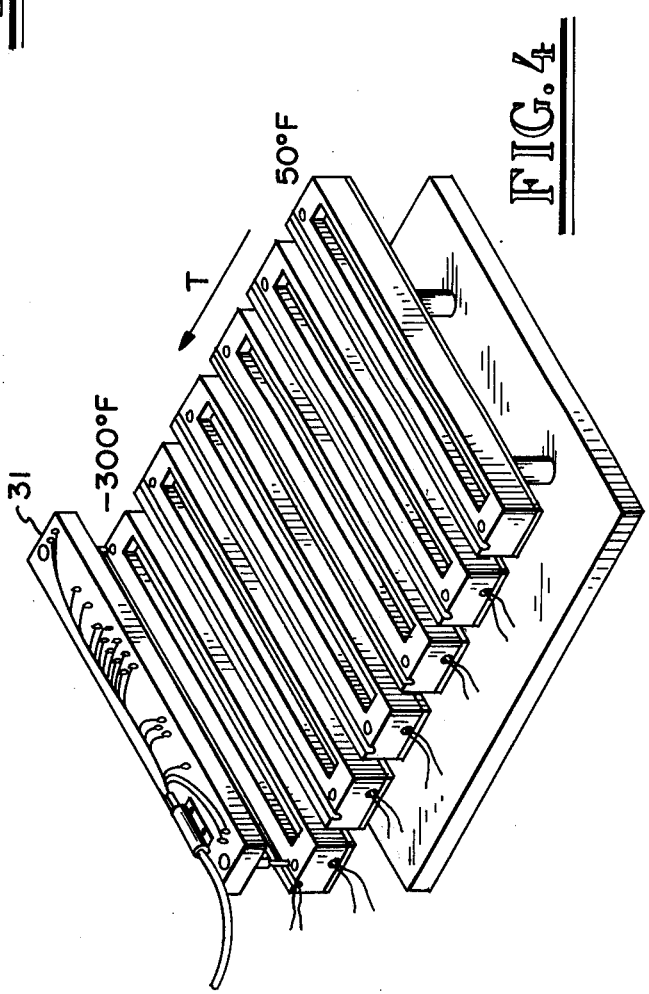
FIG. 4 is a perspective view of a test fixture.
Figure 6A:
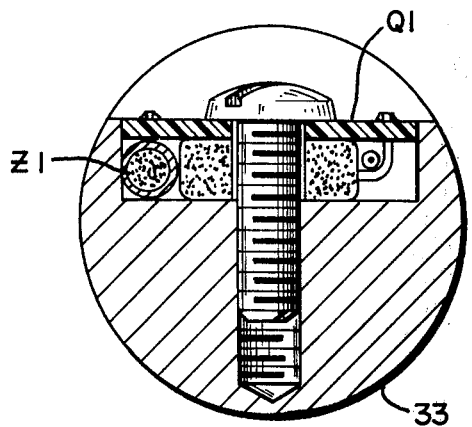
FIGS. 6A–6D are cross-sectional views of FIG. 6 along lines A–D.
Figure 6B:
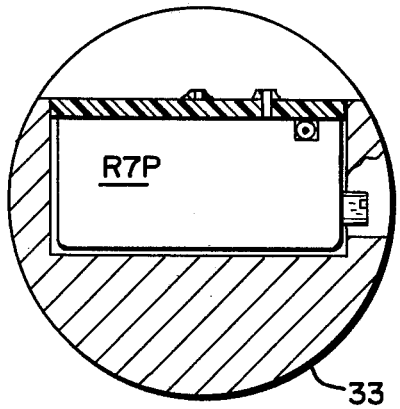
Figure 6C:
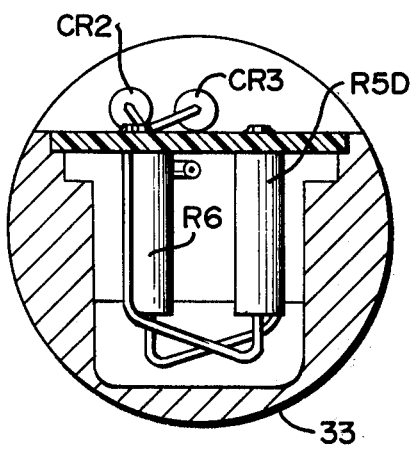
Figure 6D:
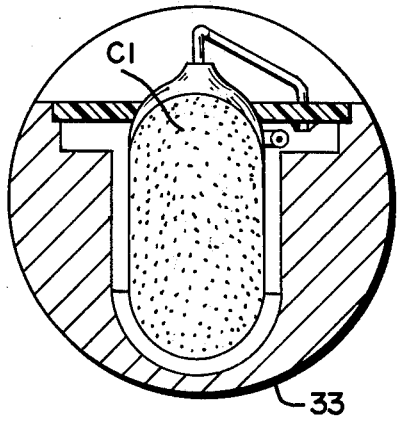

FIG. 4 shows such a simulator comprising an appropriate multiplicity of thermally conductive and massive preheated elements.

Figure 5:
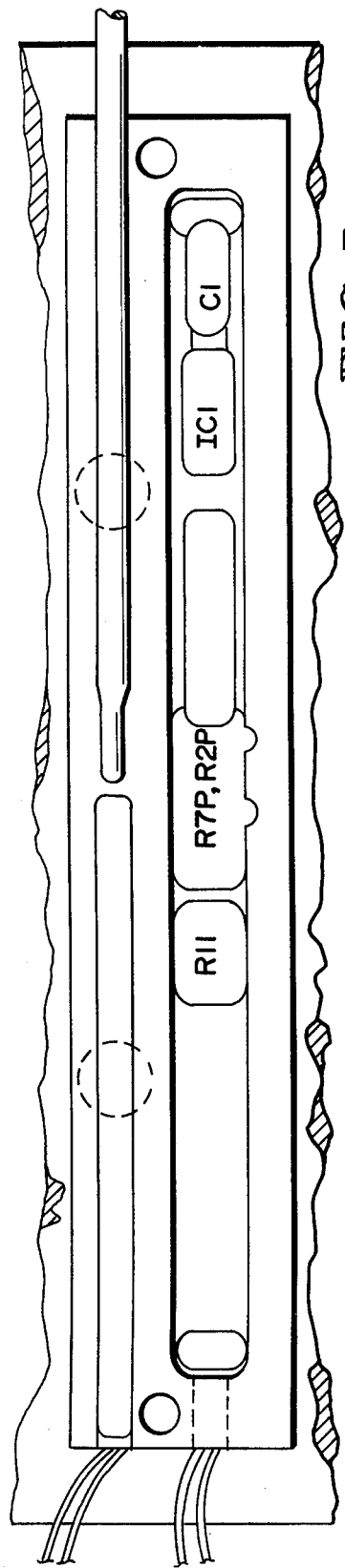
FIG. 5 is an enlarged plan view of a portion of FIG. 4.

FIG. 5 provides a more detailed view of one of the multiple elements showing a cavity identical to that of thermal mass element 33. Indicated but not detailed elements are electrical heating means, over the entire length, as well as spot thermometer and thermostat means, the purpose of which is obvious.

An additional feature of the HET simulating test fixture is an electrical contact means 31. This is equipped with conventional spring-loaded pointed electrodes arranged to engage the conductive portions of the printed circuit 32. The electrodes thus provide a means to apply the appropriate electronic testing equipment to the unit under test. Such test equipment comprises an EPUT meter, an oscilloscope, a DVM, certain custom elements such as a precalibrated resistance substitution box to simulate the bulb, $P_T$, switches to provide temporary jumpers, and of course tool power supply means.

In use the circuit elements and their circuit board 32 are placed in appropriate cavities of the HET simulator with contact means 31 properly engaged. By this means the specific desired HET is provided in a stabilized form in a matter of a few minutes. This simulation system and apparatus saves an enormous amount of time and increases accuracy over attempting to heat the entire tool in an oven, for example. In addition, test points are available which could not be reached in the closed up tool. It should be understood that several HETS must be simulated more than once to effect proper compensation.

The aforesaid time saving and accuracy can be increased even more, by the reduction of the stabilization time through the use of a multiplicity of contact means 31, or by providing a thermally conductive lid on the multiple cavities with holes to admit the electrodes. These features, in light of the above disclosure, are obvious and therefore not detailed herein.

Figure 9:
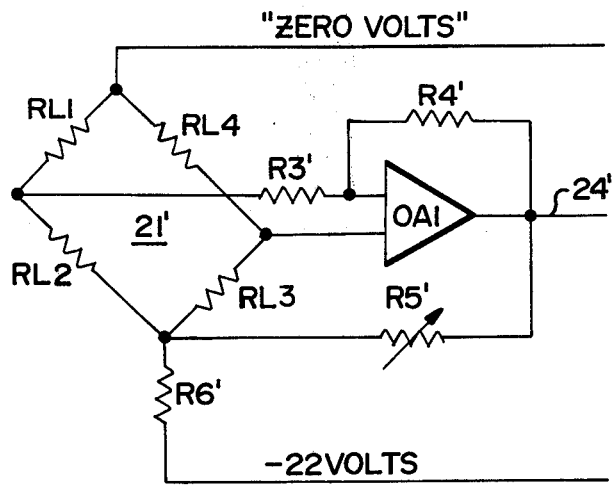
FIG. 9 is a simplified circuit diagram, similar to FIG. 2 of an alternative embodiment of the invention.

FIG. 9, like FIG. 2 is a simplified portion of the circuit detailed in FIG. 3 except that FIG. 9 is for a pressure tool.

Bridge 21', in the preferred pressure measuring embodiment of the present measuring system, is composed of four legs. All four legs are a part of a commerical straingauge type pressure sensor. Such a sensor is symmetrical with respect to the effects of HET on the bridge itself and therefore prospective errors tend to cancel. In operation the bridge legs RL1 and RL3 decrease in resistance with legs RL2 and RL4 increasing as pressure increases. Resistor R51 corrects for a bent curve occasioned by the loading effect of resistor R31 and performs other functions exactly as in the temperature portion of this disclosure. In point of fact all of the features of the disclosure as it related to temperature apply equally to the present pressure tool means.

Other pressure sensors have been applied to the precision measuring system of the present invention notably a bourdon-tube slide-wire type the application of which is felt to be obvious and therefore not detailed herein.

A less obvious application of the present system invention is the oil profile tool. U.S. Pat. No. 3,792,347 in the name of the present inventor covers the basic measuring principles of the sensor means but describes an electronic unit applicable to a three conductor down-hole cable.

Figure 10:
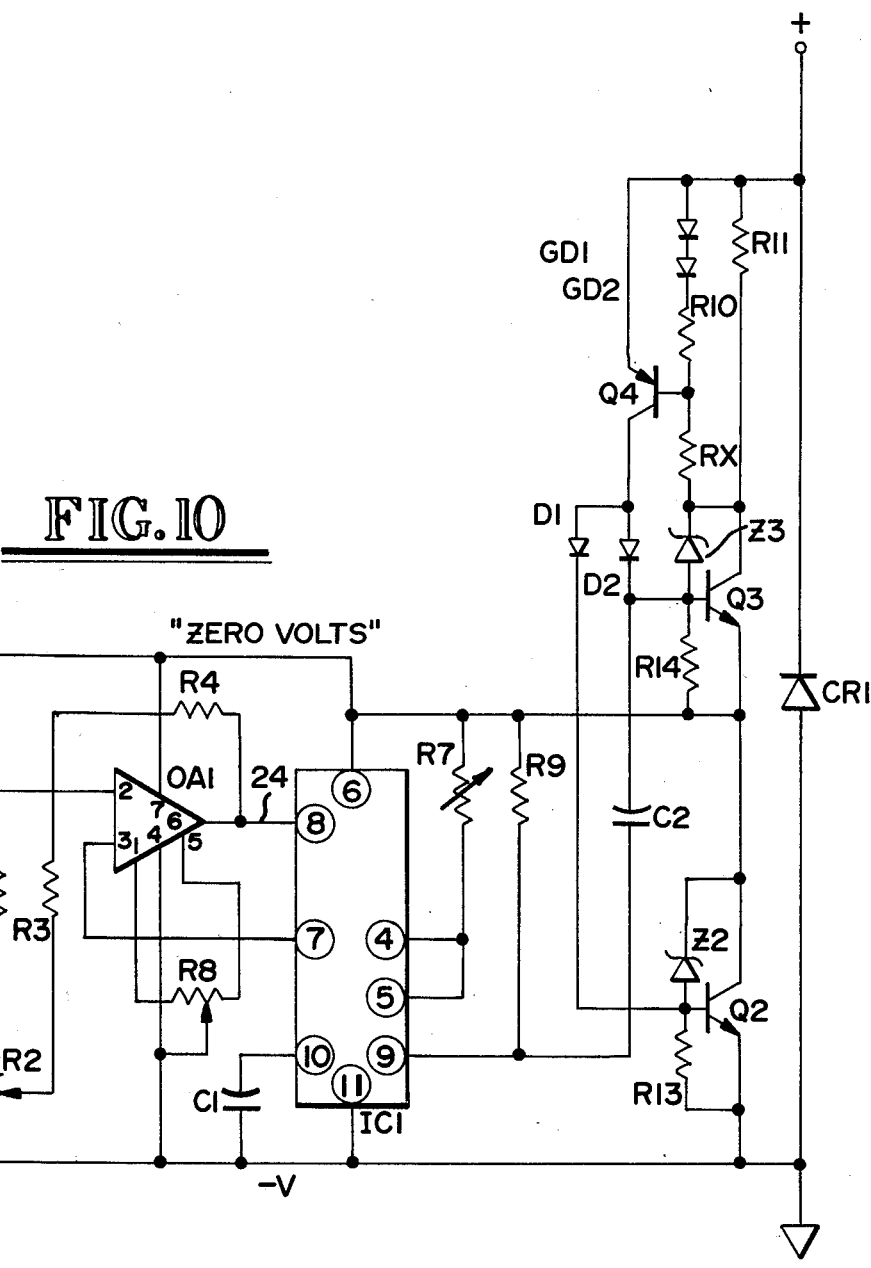
FIG. 10 is a circuit similar to FIG. 3 showing another embodiment of the invention.

FIG. 10 represents a typical circuit of the present invention as applied to the aforesaid oil profile tool. Reference is hereby made to the aforesaid U.S. Pat. No. 3,792,347 to permit brevity in the present disclosure which is directed to a technique for measuring the profile of percent of water to oil in a well.

It has been found desirable to assign the frequency 1,000 Hertz to the "no oil" (all water) condition, and 2,000 Hertz to the 100% oil or full scale value. This is by no means necessary, but will be used to describe the circuit. Several types of sensors are in fact employed with varying electrical characteristics but the principle by which circuit values are determined is well treated in the U.S. patent. Similarly the principles of the present system invention have been detailed. This section of the present disclosure will confine itself to the differences only.

The noninverting input of operational amplifier OA1 is connected to pin 7 of the VCO IC1. This pin acts as a voltage divider between pins 6 and 11. The resistor R3 is approximately equal to the value of all the sensor resistors R35 in parallel. Potentiometer R2 is trimmed to produce a frequency, with the sensor immersed in brackish water, equal to one-half the frequency obtained when the sensor is insulated.

Resistor R7 is then adjusted to produce the desired 1,000 and 2,000 Hertz from the aforesaid two to one relationship.

It will be noted that the output line 24 is made less negative by the increase in the number of resistors R35 which are conducting. This produces a lower frequency for less oil (more water).

The various functional elements, previously discussed in connection with temperature, bear labels identical to those of FIG. 3. The 4 volt regulator is not required in this embodiment. The keying transistor Q3 is relocated to permit the summing junction to remain at a constant value above the well 11 ground.

The aforesaid oil profile tool patent describes the use of a reference electrode means, the means comprising additional operational amplifier means. The additional operational amplifier means is not described herein as it is believed that such a description would be redundant with the prior patent.

Transistor Q4 operates as a high current disabling mens the utility of which has been described. The transistor is turned on by an increase in the current in line 12 to a point determined by resistor $R_X$. When Q4 is on disabling diodes DD1 and 2 collapse the power string by pulling line 12 down to the negligble voltage of a few diode forward drops. Diodes GD1 and 2 are germanium and serve to stabilize the disable set pont over the broad HET range.

It is not specifically shown in detail but it is nevertheless a feature of the present invention to provide, in the family of tools comprising this system, means for both high and low disable means within a single tool. This feature permits more than two tools to be selected on each of the polarities of line 12. The implementation of this feature should be easy to those skilled in the art in light of the foregoing disclosure contained herein, and particularly where the use of set point stabilization is used throughout.

What is claimed is:

1. A precision measuring well tool for use in hostile environment having rapidly changing ambient temperature extremes in a tool string having a single electrical conductor comprising: a sensing probe for sensing a characteristic of said well; an electrical bridge network including said probe in one leg; operational amplifier means having an input connected to the output of said bridge network and including means for adjusting an offset voltage of said input; a voltage controlled oscillator responsive to the output of said operational amplifier means for producing an output signal having a frequency proportional to the null output of said bridge network, said voltage controlled oscillator normally producing a nonlinear output under said changing ambient temperature, said offset voltage of said operational amplifier adjusted to compensate for said nonlinearity of said voltage controlled oscillator, positive feedback means connected between the output of said operational amplifier and said bridge network for correcting nonlinearity in said sensing probe; and means for keying said electrical conductor in response to said frequency of said output signal of said voltage controlled oscillator.

2. A tool as in claim 1 including heat sink means having a metallic thermal mass element for retaining all of the components of said tool, both said operational amplifier means and said voltage controlled oscillator including a separate circuit package such two packages being in physical contact with each other and including means for thermally insulating said joined packages from direct heat transfer contact with said thermal mass element.

* * * * *